United States Patent [19]
Galeener

[11] 3,732,411
[45] May 8, 1973

[54] SIGNAL INTEGRATING, STORING AND ANALYZING CIRCUIT

[75] Inventor: Courtland C. Galeener, Oklahoma City, Okla.

[73] Assignee: Wilson Certified Foods, Inc., Oklahoma City, Okla.

[22] Filed: June 17, 1971

[21] Appl. No.: 154,121

[52] U.S. Cl. ............235/183, 73/23.1, 235/151.35, 328/151, 340/173 CA
[51] Int. Cl. ..........................G06g 7/18, G01n 31/08
[58] Field of Search.......................235/151.35, 183; 328/151, 127; 320/1; 73/23.1; 340/173 CA

[56] References Cited

UNITED STATES PATENTS

| | | | |
|---|---|---|---|
| 3,375,701 | 4/1968 | Arksey | 73/23.1 |
| 3,500,028 | 3/1970 | Killian | 235/151.35 X |
| 3,185,820 | 5/1965 | Williams et al. | 235/151.35 X |
| 3,175,195 | 3/1965 | Fluhr et al. | 340/173 CA |
| 3,142,822 | 7/1964 | Martin | 340/173 CA |

OTHER PUBLICATIONS

Riso: IBM Technical Disclosure Bulletin Vol. 10 No. 10 Sample and Hold Circuit March 1968 p. 1608/9.

Primary Examiner—Felix D. Gruber
Attorney—Max Dressler et al.

[57] ABSTRACT

A circuit for integrating, storing and analyzing a signal having a plurality of peaks, such as the output of a gas chromatographic detector, in which each of a plurality of storage capacitors is successively connected to an integrator for storing each signal peak integrated. The signals being integrated may be compensated in order that the stored integrals are all on the same basis, e.g., weight percent. After storage of all of the integrals, the total integral and each of the individual integrals may be read out through a buffer which operates to inhibit discharge of the storage capacitors during readout. A voltage control circuit applies a signal to the input of the buffer approximately equal to the value of the total integral to inhibit transients during readout. The values of the stored integrals may be read out in absolute or relative units, for example, each individual integral may be read out as a percentage of the value of the total integral.

12 Claims, 3 Drawing Figures

SIGNAL INTEGRATING, STORING AND ANALYZING CIRCUIT

BACKGROUND OF THE INVENTION

Various techniques of gas chromatography are known for separation and detection of the constituents of a sample being processed. Constituents of a sample may be separated and detected by passing the sample, usually by means of an inert carrier gas, through a column of a granular solid adsorbant or a supported liquid packing. The components emerge separately and sequentially as a function of time and are detected at the exit of the column, typically by a transducer responsive to the thermal conductivity of the individual constituents.

The detection and measurement of the individual constituents are usually reflected by an electric signal which identifies the sample components, typically by the time at which the signal indicative of a constituent appears. The quantity of each component present is determined by measuring peak heights or peak areas of the signals occurring at given times, as modified by calibration factors determined by analysis of known mixtures. The areas under each peak are conveniently evaluated by means of integrating circuits.

A wide variety of integrating circuits of varying complexity and cost are used in gas chromatographic analyses. Available circuits which provide information about a number of constituents in a sample being analyzed are often complex and expensive, as, for example, the system disclosed in Killian U.S. Pat. No. 3,500,028.

It is highly desirable to provide a system for analysis of the output of a gas chromatographic detector capable of providing a convenient readout either in absolute values or in relative values, capable of providing analyses on various bases, such as weight percent, mole percent or area percent without the need of subsequent calculations, and with flexibility for measuring all or a portion of the signals, i.e., constituents, detected. Such a system should be of low cost, have a wide range of measurement capability, provide rapid and accurate results and, of course, be compatible with the various makes and models of gas chromatographs.

SUMMARY OF THE INVENTION

In accordance with the present invention there is provided in a system for analysis of gas chromatographic signals, a circuit for analyzing a plurality of such signals and for providing absolute or relative readouts. The system of the present invention is simple, easy to operate and versatile.

In the system of the present invention, the signals representative of the constituents are applied to an integrating circuit. The input signals are compensated for various factors so that all signals are measured on a uniform basis. Each of a plurality of integral storage circuits is selectively connected to the integrating circuit to store the integral of each signal. Between integrals, the storage circuits are isolated to inhibit undesired deterioration of the stored integral.

Subsequent to storage of all integrals of the detected signal, the total integral, the sum of the individual integrals, may be applied to a readout device through a suitable buffer, which prevents discharge of the integral storage circuits during readout. Each individual integral may be similarly read out. As a result, the integrals may be read in absolute units or in relative units to a desired standard, such as the value of the total integral.

More specifically, the output signal from a gas chromatographic detector system is applied to the input of an operational amplifier integrating circuit through a variable response control adjusted to compensate for the different response of most gas chromatographic detectors to various compounds. In an integrate mode, a plurality of storage capacitors, nominally connected in series, are each individually adapted to be connected to the output of the integrator.

The integrator is discharged prior to the beginning of each peak of the chromatographic output signal. At the beginning of each peak, a single storage capacitor is connected to the integrator output. Each storage capacitor is disconnected from the integrator output at the end of the signal being integrated, and the integrator is discharged in order that it is in condition to integrate the next signal received. When all the peaks in the output signal from the gas chromatographic detector have been integrated, the integrating capacitor is discharged and the system is placed in a read mode.

In the read mode, the output of the integrator is disconnected from the storage capacitors, which are adapted to be connected to the input of a very high input impedance buffer amplifier. The output of the buffer amplifier is connected to a readout device, such as a digital voltmeter. The buffer amplifier is utilized to prevent discharge of the storage capacitors during readout and operates as a non-inverting, unity gain amplifier supplying current required for the digital readout.

When the system is switched into the read mode, a signal, selected to approximate the value total integral, is applied to the input of the buffer in order to avoid switching transients when the total integral is connected to the buffer input for readout. The output of the buffer is connected to the input of a readout device such as a digital voltmeter through a variable output control used to adjust the buffer output so that the desired type of reading may be achieved. If it is desired to provide a readout in relative units, the output of the buffer amplifier representative of the total integral is adjusted until the readout device indicates 100 percent. Each storage capacitor when read out individually thereafter will be read as a percentage of the total.

Thus, there is provided a simplified and highly adaptable circuit for integration, storage and analysis of signals, typically output signals, from gas chromatographic detectors in which each of the peaks are integrated, the integrals stored, the sum of the integrals and each individual integral read out on the same basis taking into account the variations in the response of the gas chromatographic detector to various compounds, and the readout itself adjusted to readout in the desired units, either absolute or relative to a selected standard.

Numerous other advantages and features of the present invention will become readily apparent from the following detailed description of the invention and of one embodiment thereof, from the claims and from the accompanying drawings in which each and every detail shown is fully and completely disclosed as a part of this specification, in which like numerals refer to like parts.

Figure 2:
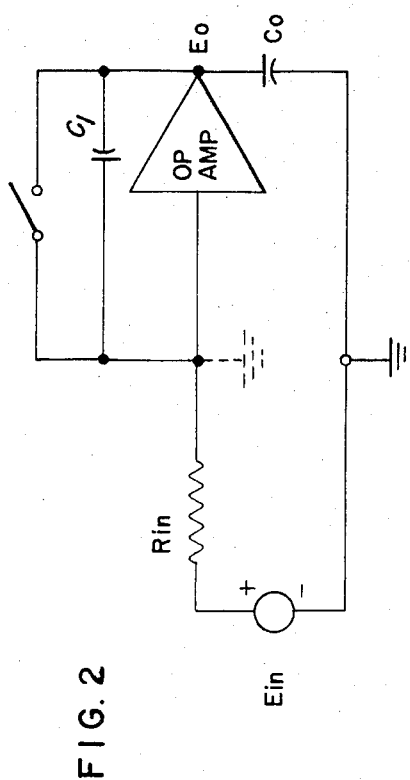
FIG. 2 is a diagram of a standard operational amplifier integrating circuit.
Figure 1:
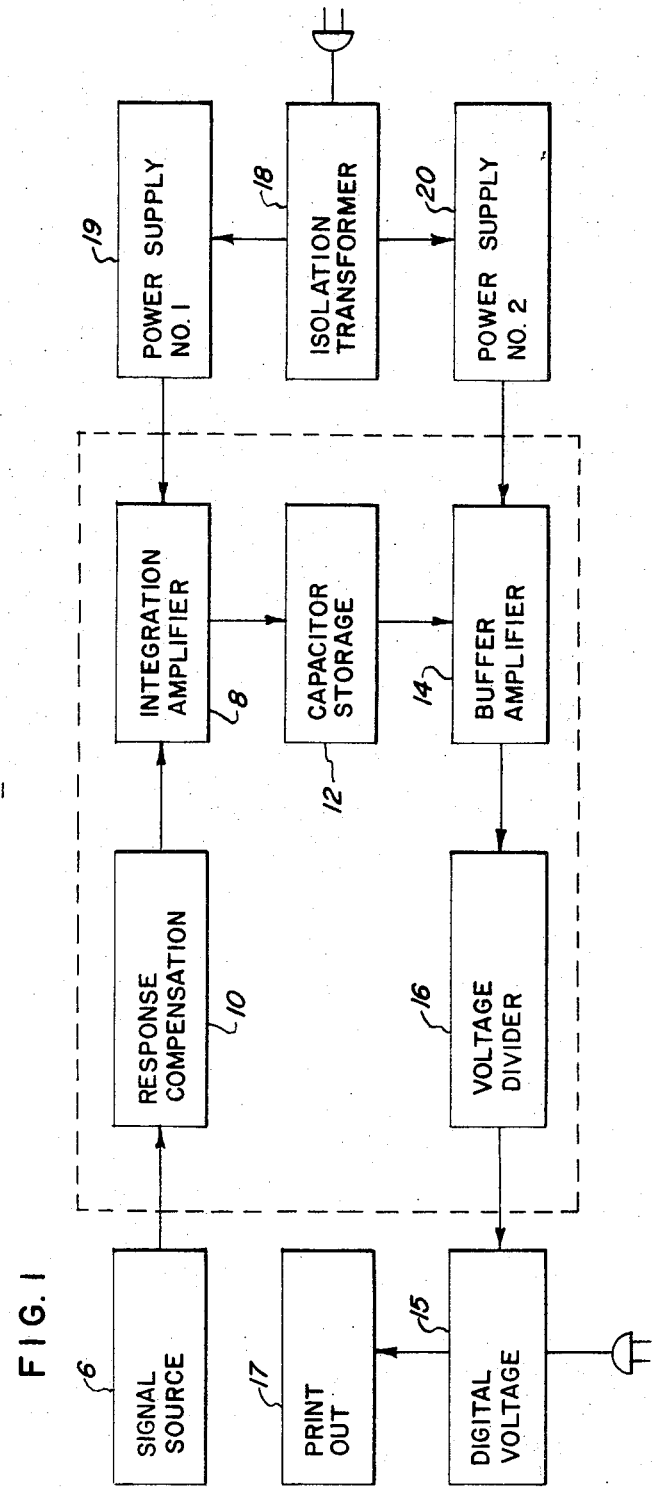
FIG. 1 is a block diagram of a system incorporating the present invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

In accordance with the present invention, a signal such as the output signal from a chromatographic detector 6, the signal source, is applied to the input of an integrator 8 through an adjustable response control 10. The response control 10 compensates for the different response of the signal source to various compounds. Each signal is integrated by the integrator 8 and the integral is stored in one of the plurality of capacitors forming the integral storage circuit 12, each integral being stored on a separate capacitor.

The stored integrals are read out through a buffer amplifier 14 to a readout device 15, typically a digital voltmeter, through a voltage divider or output control 16 used to adjust the value of the buffer amplifier output to desired units. The digital voltmeter may be connected to a print out device 17 for obtaining a printed readout in addition to the direct read-out from the digital voltmeter.

Power for the system is provided through a step-up isolation transformer 18. The secondary of the isolation transformer 18 is connected to a power supply 19 for the integrator 8 and to a power supply 20 for the buffer amplifier 14.

The integrator circuit utilized as part of the present invention is derived from a conventional integrator shown in FIG. 2. The circuit includes an operational amplifier. An integrating capacitor $C_1$ is connected between the output and the inverting input of the operational amplifier. A switch connected across the integrating capacitor $C_1$ is used to discharge the capacitor prior to commencement of integration. The input signal $E_{in}$ is applied to the inverting input of the operational amplifier across an input resistance $R_{in}$. The integral voltage $E_0$ at the output of the operational amplifier is stored on the output capacitor $C_0$ connected between the operational amplifier output and ground.

The voltage integral stored on the output capacitor $C_0$ is stable if no conductive path is provided for discharge of the output capacitor. After the integral is stored on the output capacitor, the output capacitor may be disconnected from the operational amplifier output and the bypass switch closed to discharge the integrating capacitor and render the voltage integral present at the output of the operational amplifier equal to zero.

The operational amplifier maintains the inverting input at virtual ground potential. The current flowing toward the inverting input is $E_{in}/R_{in}$. Since the operational amplifier accepts no appreciable current and since the integrating capacitor $C_1$ effectively blocks DC current, all current applied to the input during integration results in a build up of charge on $C_1$. $E_0$ is a negative voltage integral so long as $E_{in}$ remains positive with respect to ground.

The magnitude of the input current is directly proportional to the instantaneous value of $E_{in}$, and thus, the final voltage on the integrating capacitor $C_1$ is proportional to the total current flow during the time of integration.

Figure 3:
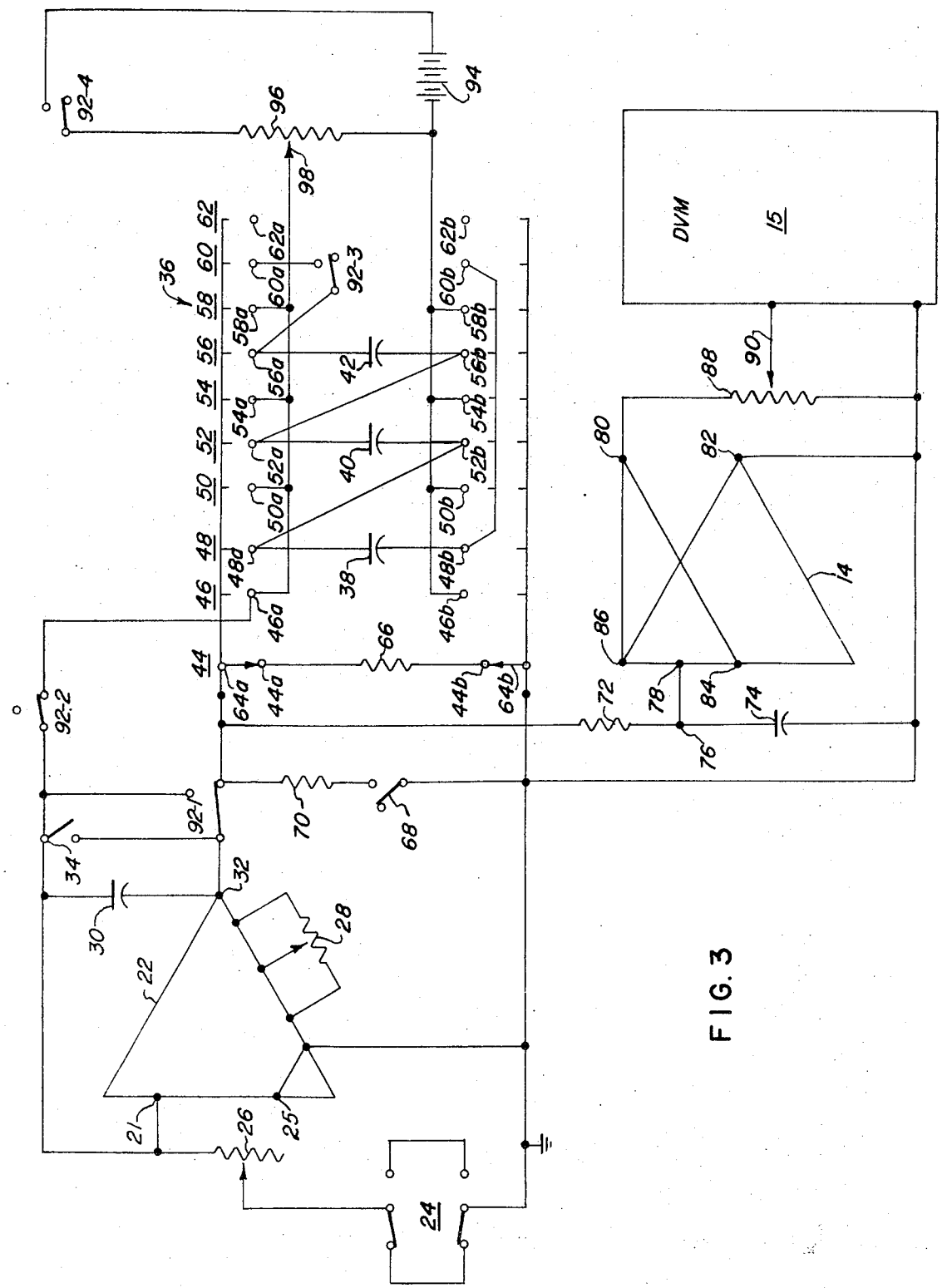
FIG. 3 is a schematic diagram of a circuit incorporating the present invention.

In FIG. 3 there is shown a circuit incorporating the present invention. One use of this circuit is for the analysis of gas chromatographic signals. The circuit includes an integrating operational amplifier 22. The output of a gas chromatographic detection circuit, or other signal source, is applied across the terminals of an input switch 24. This signal is connected to the inverting input 21 of the operational amplifier 22, also having a non-inverting input 23, across a response control, variable resistor 26, used to compensate for the variable response of detectors to different compounds. The response control is a potentiometer which may conveniently be divided into units, such as 1,000 units, by attaching a turns counting dial calibrated between 0 and 1,000. The setting of this dial indicates the fraction of the total resistance times 1,000, allowing the relative weight responses to be dialed in directly.

The response control permits the rapid adjustment and selection of the correct resistance for each integral in order that all integrals are obtained on the same basis, weight percent, mole percent or any other desired basis. The weight response of each compound, for example, is calculated by dividing the voltage integral by the weight of the material giving rise to the particular signal integrated. The component with the greatest weight response may be used as a basis for calculating relative weight responses. For this calculation, each weight response is divided by the greatest weight response and the result multiplied by a given constant, e.g., 1,000. One thousand may be chosen so that the relative weight response may be dialed in directly to select the proper relative resistance of the response control resistor 26.

When it is desired to apply a signal to the input of the integrating amplifier, the input switch 24 which in the off position shorts out the input terminals, is opened. In the off position, the input switch 24 connects the input of the operational amplifier to ground allowing for adjustment by the balance control 28 for zero adjustment of the operational amplifier.

An integrating capacitor 30 is connected between the output 32 of the operational amplifier 22 and its inverting input 21. The non-inverting input terminal 23 is connected to signal ground. A clear switch 34 is connected across the capacitor 30. When closed, the clear switch 34 shorts out the capacitor 30 to remove any residual charge on the capacitor prior to integration.

A selector switch 36 is used to selectively connect a plurality of integral storage capacitors to the output 32 of the integrating amplifier 22. While the size of the switch is determined by the number of capacitors desired to be used, the selector switch 36 is shown in FIG. 3 for use with three storage capacitors 38, 40, 42. The selector switch 36 is shown as having ten positions 44–62, each position being defined by a pair of contact terminals 44a, 44b – 62a, 62b.

The selector switch 36 incorporates a pair of interconnected wipers 64a, 64b movable together from position to position of the selector switch. At each position, wiper 64a makes contact with the corresponding a terminal and wiper 64b makes contact with the corresponding *b* terminal at that position. Typically, the wiper 64a is of the break/make type, it breaks contact with the previous terminal before it makes contact with the next terminal, while the other wiper 64b is of the make/break type, it makes contact with the next terminal before breaking contact with the previous terminal, and is always connected to signal ground.

A load resistor 66 is connected between the terminals 44a, 44b at the first or start position 44 of the selector switch 36, and is used when the integrating amplifier 22 is balanced or zeroed by adjusting the balance control 28. The second position 46, fourth position 50, sixth position 54 and eighth position 58 of the selector switch 36 are standby positions, the purpose of which is explained below. The standby terminals 46a, 50a, 54a and 58a are interconnected, as are the standby terminals 46b, 50b, 54b and 58b.

The third position 48, fifth position 52 and seventh position 56 of the selector switch 36 are the storage positions. The integral storage capacitors 38, 40, 42 are connected between the terminals of the storage positions 48, 52, 56, respectively. The ninth position 60 of the selector switch 36 is the total position. The capacitors 38, 40, 42 are serially connected across the terminals 60a, 60b by connecting terminal 60a to terminal 56a, by connecting terminal 56b to terminal 52a, by connecting terminal 52b to terminal 48a and by connecting terminal 48b to terminal 60b. The tenth or last position 62 of the selector switch 36 is available for external connection, e.g., to an external standard.

A normally open reset switch 68, connected in series with a shunt resistor 70 is connected between the wipers 64a, 64b. When the reset switch 68 is closed, the shunt resistor 70 is connected across each storage capacitor 38, 40, 42 to discharge each capacitor as the wipers 64a, 64b are moved to each storage position.

Wiper 64a is connected to one side of the buffer amplifier input resistor 72 the other side of which is connected to one side of the buffer amplifier input capacitor 74. The other side of the input capacitor 74 is connected to wiper 64b, which is always connected to signal ground. The junction 76 between the input resistor 72 and the input capacitor 74 is connected to the inverting input 78 of the buffer amplifier 14.

In the configuration disclosed, the inverting input 78 of the buffer amplifier 14 is utilized as the signal input. The amplifier ground terminal 86 and the non-inverting amplifier input terminal 84 are both connected to a common terminal 80 which is located at the common terminal (manufacturer's designation) of the constant voltage power supply 20 (FIG. 2). This configuration permits the use of a chopper stabilized operational amplifier as a buffer for greater drift stability.

Terminal 80 is connected to one side of the output control potentiometer 88 while the other side of potentiometer 88 is connected to signal ground. The amplifier output terminal 82 is also connected to signal ground. It is to be noted that the power supply 20 for the buffer amplifier is left floating, i.e., not connected to signal ground. The adjustable tap 90 of the potentiometer 88 is connected to the input of the readout device or digital voltmeter 15. If, for example, the readout is desired in relative units, the adjustable tap may be adjusted when the total integral is presented for readout until the digital voltmeter 15 reads 100 percent. Each individual integral will then be read out as a percentage of the total integral.

A 4PDT mode or function switch 92 is operable to place the system in either an integrate mode or a read mode. In the integrate mode, contacts 92–1 connect the output 32 of the integrating amplifier 22 to wiper 64a. In the read mode, contacts 92–1 short out the integrating capacitor 30 and simultaneously disconnect the output 32 from the selector switch so that the integrals stored on the storage capacitors may be read out.

Contacts 92–2, in the integrate mode, connect the input 21 of the integrating amplifier 22 to the standby terminals 46a, 50a, 54a and 58a. Thus, when the wiper 64a is in each standby position, the integrating capacitor 30 is shorted out to insure its complete discharge before the next storage capacitor is connected to the output 32 of the integrating amplifier 22.

Contacts 92–3 of the mode switch 92 are open in the integrate mode and are closed in the read mode to connect storage terminal 56a to total terminal 60a. Contacts 92–4 are also open in the integrate mode, and, in the read mode, connect a voltage control source 94 across a voltage control potentiometer 96. One side of the potentiometer 96 is connected to standby terminal 58b, while the adjustable tap 98 of the potentiometer 96 is connected to standby terminal 58a.

When contacts 92–4 are closed, i.e., in the read mode, a voltage is applied across the buffer input resistor 72 and input capacitor 74, when the wipers 64a, 64b are in one of the standby positions, to pre-charge the input capacitor 74. The input capacitor 74 is pre-charged in order to avoid open circuiting the input of the buffer amplifier 14, thereby minimizing switching transients, as the wipers 64a, 64b of the selector switch 36 are moved from one storage position to another. The value of the charge placed on the input capacitor 74 is selected by adjusting the tap 98 of the voltage control potentiometer 96 so the voltage applied approximates the value of the total integral.

In operation, wipers of the selector switch 36 are placed in the start position and the circuit is turned on. The input switch 24 is shorted and the operational integrating amplifier 22 is zeroed out or balanced by adjusting the balance control 28. Clear switch 34 may be closed momentarily to completely discharge the integrating capacitor 30. The input switch is then turned on and the signal applied across the input switch terminals. The response control is adjusted in a known manner. At the beginning of a peak in the signal from the chromatographic detector, as reflected by observation of the digital voltmeter which is connected across the output of the buffer amplifier, the selector switch wipers are moved from standby position 46 to storage position 48 thereby connecting storage capacitor 38 to the output of the integrating amplifier to store the integral value of each received signal as a voltage.

At the end of the peak signal, the selector switch wipers are moved to standby position 50 to disconnect the storage capacitor 38 from the output 32 of integrating amplifier 22 and to short out and discharge integrating capacitor 30. The above steps are repeated for each peak of the signal which is to be stored until all of the integrals are stored. When the wipers 64a, 64b are in the final standby or hold position 58, mode function switch is placed in the read position to disconnect the selector switch from the output of the integrating amplifier, to short out the integrating capacitor, to close the circuit activating the voltage control and to connect all of the storage capacitors in series across the total terminals 60a and 60b.

The adjustable tap of the voltage control potentiometer is adjusted until the input capacitor 74 is precharged to a value approximately equal to the total integral. The wipers are then placed in the total position and the total integral is read out through the buffer amplifier. The output control tap 90 may then be adjusted until the output reads 100 percent or reads the absolute value of the total integral. Each individual integral may then be read by moving the wipers to each of the storage positions. If the response control adjustable resistor 26 has been adjusted prior to each integral to compensate for the variable response of the chromatographic detector to different compounds on a uniform basis, e.g., a weight basis, the results will be obtained on that basis, for example, weight percentage units.

After reading out all of the integrals, the reset switch is closed, and the wipers are moved through all of the positions to discharge each of the storage capacitors. The wipers are then returned to the first standby position 46, the mode switch is returned to the integrate mode position and the system is prepared to process the next signal applied to the terminals of the input switch.

In one embodiment of the circuit of FIG. 3 the following components were utilized:

| | |
|---|---|
| Buffer amplifier 14 | Zeltex model 140B chopper stabilized operational amplifier |
| Integrating amplifier 22 | Analog Devices' chopper stabilized operational amplifier, model 203 |
| Input switch 24 | Alcoswitch model MSTE–206N, DPDT |
| Adjustable resistor 26 | Amphernol 10 turn, 100K ohm linear potentiometer type 205 |
| Balance control 28 | Spectrol 10 turn 50K ohm linear potentiometer model 162 |
| Integrating capacitor 30 | Goodall 5μf, 200V, metallized mylar capacitor type X633 F |
| Clear switch 34 | Alcoswitch type MSPE–106F, SPDT |
| Selector switch 36 | Shallcross rotary switch, series 4 |
| Storage capacitors 38, 40, 42 | 2μf, 600V, mylar |
| Resistor 66 | 1K ohm |
| Reset switch 68 | Arrow-Hart type TS–3M, SPDT |
| Shunt resistor 70 | 1K ohm |
| Resistor 72 | 150K ohm |
| Capacitor 74 | 0.0025μf Centralab type CPR–2500J, 500WVDC |
| Resistor 88 | 10 turn Clarostat series 62, 100K ohm potentiometer |
| Mode switch 92 | Alcoswitch type MSTE–406P, 4PDT |
| Resistor 96 | 10 megohm potentiometer |

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. In a system for analysis of gas chromatographic signals, a circuit for integrating, storing and analyzing a plurality of said gas chromatographic signals comprising:

integrating circuit means connected to receive and integrate each of said gas chromatographic signals;
a plurality of signal storage means for storing signals having a value representative of the integrals of the value of the received signals;
signal readout means including buffer means to prevent discharge of said storage means during readout;
switching means selectively operable to connect each of said signal storage means to said integrating circuit means for storing the signal representative of the integral of each received signal therein, to disconnect each of said signal storage means from said integrating circuit means when a received signal is integrated and to simultaneously discharge said integrating circuit means, to connect all of said plurality of signal storage means to said readout means through said buffer means to provide a readout of the total of said stored signals, and to successively connect each of said signal storage means individually to said readout means for providing a readout of each stored signal.

2. A circuit as claimed in claim 1 wherein said integrating circuit means includes operational amplifier means and integrating capacitor means connected between the input and the output of said operational amplifier means;
and adjustable compensating means coupling said received signals to the input of said operational amplifier means, said switching means being operable to selectively connect said plurality of signal storage means to the output of said operational amplifier means.

3. A circuit as claimed in claim 2 wherein said switching means includes bistable mode switching means having an integrate state and a read state and selector switching means,
said mode switching means in its integrate state connecting the output and the input of said operational amplifier to different portions of said selector switching means,
said selector switching means being adapted to selectively connect each of said signal storage means to the output of said operational amplifier through said mode switching means in its integrate state and for selectively disconnecting said integral storage means from said operational amplifier output and simultaneously interconnecting said operational amplifier input and output through said mode switching means in the integrate state to discharge said integrating capacitor.

4. A circuit as claimed in claim 3 wherein said mode switching means in its read mode is operable to disconnect said operational amplifier input and output from said selector switching means.

5. A circuit as claimed in claim 4 including voltage control means for applying an adjustable control signal to said readout means equal to the estimated value of the total of the signals stored in said integral storage means, whereby transients during readout of the integrals are inhibited,
and wherein said mode switching means in said read state is operable to enable said voltage control means and to selectively connect said voltage control means to said readout means.

6. A circuit as claimed in claim 1 including means for adjusting the value of the total stored signal being readout, whereby each of said stored signals may be readout in selected units.

7. A circuit as claimed in claim 1 including means for adjusting the value of the total stored signal being readout to effect readout of each of the stored signals in absolute units.

8. A circuit as claimed in claim 1 including means for adjusting the value of the total stored signal being readout whereby each of the stored signals may be readout in units related to a selected standard.

9. A circuit as claimed in claim 1 including means for adjusting the value of the total stored signal being readout whereby each of the stored signals may be readout as a function of the value of the total stored signal.

10. A circuit as claimed in claim 3 wherein each of said plurality of signal storage means includes storage capacitor means;

wherein said selector switching means includes a plurality of storage terminal pairs and means connecting each of said storage capacitor means between a different pair of said storage terminals, a plurality of standby terminal pairs alternating with said plurality of storage terminal pairs, a corresponding one of each pair of said standby terminal pairs being connected together and to the input of said operational amplifier through said mode switching means in the integrate state, a pair of total terminals and means, including said mode switching means in the read state connecting said plurality of storage capacitor means in series between said pair of total terminals, wiper contact means connected to the output of said operational amplifier through said mode switching means in the integrate state and adapted to sequentially engage each pair of terminals, whereby said wiper contact means is operable to complete a circuit to discharge said integrating capacitor when engaging a pair of standby terminals and to connect a storage capacitor to the output of said operational amplifier when engaging one of said storage terminal pairs.

11. A circuit as claimed in claim 10 including buffer input circuit means including buffer input capacitor means, means connecting said buffer input circuit means to said selector switch wiper contact means whereby the signal being stored on one of said storage capacitors may be simultaneously read out.

12. A circuit as claimed in claim 11 including voltage control means for applying an adjustable control signal to said buffer input circuit to pre-charge said input capacitor to a value approximately equal to the estimated value of the total of the integrals stored on said storage capacitors, whereby transients during readout are inhibited, circuit means including said mode switching means in said read state enabling said voltage control means and connecting said voltage control means to said standby terminal pairs, whereby said voltage control means is connected to said buffer circuit means when said wiper contact means engage any of said standby terminal pairs, said wiper contact means being further operable to effect readout of said total stored signal when engaging said pair of total terminals and to effect readout of each of said stored signals when engaging a corresponding storage terminal pair.

* * * * *